United States Patent [19]

Mehalla

[11] Patent Number: 4,465,811

[45] Date of Patent: Aug. 14, 1984

[54] AROMATIC HYDROCARBON RESINS CONTAINING VINYLKETONE GROUPS AND POLYMERS THEREOF

[75] Inventor: Hacene Mehalla, Strasbourg, France

[73] Assignee: Societe Chimique des Carbonnages S.A., Paris la Defense, France

[21] Appl. No.: 382,315

[22] Filed: May 26, 1982

[30] Foreign Application Priority Data

May 26, 1981 [FR] France ................ 81 10433

[51] Int. Cl.³ .............. C08F 8/00; C08F 32/00; C08F 12/08
[52] U.S. Cl. .................... 525/249; 525/292; 525/289; 525/250; 525/300; 526/77; 526/280; 526/290
[58] Field of Search .............. 525/332, 334, 359, 300, 525/292

[56] References Cited

U.S. PATENT DOCUMENTS

| | | | |
|---|---|---|---|
| 2,566,302 | 9/1951 | Allen et al. | 260/66 |
| 3,219,644 | 11/1965 | Leavitti | 260/93.5 |
| 3,223,679 | 12/1965 | Leavitt | 260/66 |
| 4,100,336 | 7/1978 | Yax et al. | 526/67 |

*Primary Examiner*—Carman J. Seccuro
*Attorney, Agent, or Firm*—Millen & White

[57] ABSTRACT

Aromatic hydrocarbon resins having a number-average molecular weight of 500–2,500 and containing, in particular, units derived from styrene and/or from its higher homologs, are acylated with vinylketone groups RR'C=CR"—CO— grafted onto the aromatic nuclei of the said resin, said resin further containing from 10 to 90 mol %, and preferably from 30 to 60 mol %, of units derived from indene and/or from its higher homologs, and containing from 0.02 to 0.07 grafted vinylketone group per aromatic nucleus.

The resultant acylated resins are either polymerized anionically to polymers having a weight-average molecular weight ranging from $10^4$ to $2.10^7$, or are copolymerized with a living polymer such as polymethyl methacrylate.

20 Claims, No Drawings

AROMATIC HYDROCARBON RESINS CONTAINING VINYLKETONE GROUPS AND POLYMERS THEREOF

BACKGROUND OF THE INVENTION

The present invention relates to aromatic hydrocarbon resins containing vinylketone groups, and to polymers produced therefrom.

Mixtures of aromatic compounds containing polymerizable double bonds, e.g., indenes, styrenes and vinyltoluene, can be copolymerized to yield aromatic resins. Whereas such resins are relatively inexpensive because they can be produced from an unseparated mixture of aromatic compounds obtained, for example, from the steam cracking of naphthas, these resins have found limited utility because of their low molecular weight and relatively poor properties. Conversely, it is also known, for example from U.S. Pat. Nos. 2,566,302 and 3,223,679, that the degree of unsaturation of polystyrene resins having a molecular weight of preferably not less than 3,000, for example on the order of 40,000 to 50,000 can be increased by reacting an unsaturated acid chloride with the polystyrene in the presence of a Lewis acid.

OBJECTS OF THE INVENTION

An object of this invention is to provide relatively inexpensive high molecular weight polymers having improved properties, and processes for their preparation.

Another object is to provide intermediates for the production of such polymers as well as processes for the production of such intermediates.

Upon further study of the specification and appended claims, further objects and advantages of this invention will become apparent to those skilled in the art.

SUMMARY OF THE INVENTION

The intermediates of the present invention comprise an aromatic hydrocarbon resin containing, in particular, units derived from indenes and styrenes, said resin having vinylketone groups grafted onto the aromatic nuclei thereof, said vinylketone groups having the general formula RR'C=CR"—CO—, in which the radicals R, R' and R", being identical or different, represent hydrogen, methyl, ethyl, n-propyl, isopropyl, or halogen. The aromatic resin contains from 10 to 90 mol %, and preferably from 30 to 60 mol %, of units derived from indenes and said resin contains from 0.02 to 0.07 grafted vinylketone group per aromatic nucleus. The number-average molecular weight of the aromatic hydrocarbon resin used as the starting material is generally between 500 and 2,500.

DETAILED DISCUSSION

The units derived from styrenes include units derived from styrene and higher homologs thereof including but not limited to: α-methylstyrene, cis- and trans-β-methylstyrenes.

All the isomers of vinyltoluene can be employed.

The units derived from indenes include units derived from indene and higher homologs thereof including but not limited to: 2-methylindene and 3-methylindene The aromatic hydrocarbon resin intermediate according to the invention is obtained by treating with an unsaturated acid chloride, an aromatic hydrocarbon resin used as the starting material and obtained, for example, by the polymerization of mixtures of aromatic hydrocarbons advantageously originating from the steam cracking of naphtha. Steam cracking of naphtha is disclosed, for example, in the Process Economics Program, volume 29, supplement B, pages 147–180 published by the Stanford Research Institute, Menlo Park California. The gasoline fraction thus obtained is distilled off to obtain the suitable aromatic hydrocarbon fraction.

Said mixtures of aromatic hydrocarbons generally contain styrene, α-methylstyrene, vinyltoluenes. indene and methylindenes. Advantageously, a mixture of this type contains 1 to 30 mol %, preferably 10 to 25 mol % styrenes, 9 to 60 mol %, preferably 30 to 45 mol % vinyltoluenes, and 10 to 90 mol %, and preferably from 30 to 60 mol %, of indene+methylindenes together. They can also contain toluene in small amounts, xylenes and ethylbenzene. These mixtures are polymerized, preferably by conventional cationic polymerization, e.g., in the presence of a Lewis acid, and preferably in accordance with a continuous process such as described in French Pat. No. 2,344,572, to yield an aromatic hydrocarbon resin starting material having an average molecular weight of between 500 and 2,500 and a Kraemer-Sarnow softening point of between 50° and 150° C., especially from 90° to 140° C.

The unsaturated acid chloride reacted with this aromatic hydrocarbon resin starting material has the general formula RR'C=CR"—COCl, in which R, R' and R", which are identical or different, represent hydrogen, methyl, ethyl, n-propyl and isopropyl or halogen. Thus, it is possible to use the chlorides of, for example, acrylic, methacrylic, crotonic, isocrotonic, 2-chloroacrylic, 3-chloroacrylic, tiglic, angelic, pent-2-enoic, hex-2-enoic and 2,3-dichloroacrylic acids, the acrylic and methacrylic being preferred. (By way of nomenclature, the chlorides of the acids can also be named by changing the "ic" suffix to "yl" with "chloride" following. Acid chlorides are also called acyl chlorides.)

Before the reaction, the aromatic hydrocarbon resin is dissolved in an inert solvent such as methylene chloride.

The reaction of the acid chloride with the aromatic hydrocarbon resin leads to the attachment of the radical RR'C=CR"—CO— to the aromatic nuclei of the said resin. The extent of attachment depends on the ratio of the number of moles of acid chloride used to the number of aromatic nuclei present in the amount of resin reacted. It is preferred to use a ratio which leads to the formation of a modified resin containing from 0.02 to 0.07 vinyl ketone group RR'C=CR"—CO— per aromatic nucleus. The resultant acylated resin containing a higher proportion of vinyl ketone groups are difficult to obtain because of their tendency to form a gel. The number-average molecular weight of the resultant acylated resin is generally about 2,000 to 6,000.

The acid chlorides react with aromatic nuclei, whatever the substitution on aromatic nulcei may be.

The resultant vinyl ketone containing aromatic hydrocarbon resin intermediates can then be converted to very high molecular weight polymers, e.g., weight-average molecular weight of $10^4$ to $2 \times 10^7$ These very high molecular weight polymers can be used in the field of coating material, elastomers and hot-melt adhesives.

The polymerization of the aromatic hydrocarbon resin intermediate containing vinylketone groups is generally conducted in a solvent (usually an ether such as tetrahydrofuran), in the presence of an anionic catalyst such as, for example, an alkyl-lithium or alkyl-sodium. To prevent crosslinking, the reaction is generally started at a low temperature of about 200° to 210° K., and continued at ambient temperature. The product of this reaction is entirely soluble.

The cooling bath is withdrawn immediately after the resin solution is mixed with the n-butyl-lithium solution; the temperature is allowed to rise to ambient.

It is also possible to anionically copolymerize the aromatic hydrocarbon resin intermediate with a living polymer having a weight-average molecular weight of preferably 2,000 to 20,000, especially 3,000 to 10,000, such as, for example, polystyrene$^\ominus$ or polymethyl methacrylate$^\ominus$, obtained by an anionic process, the counter-ion being lithium or sodium. (Living polymers are well known and are characterized by having active polymerizable end groups—see, e.g, Textbook of Polymer Science, 2nd Edition, Billmeyer, 1971, John Wiley & Sons, Inc., pp. 516-518). This copolymerization is started at low temperatures of about 200° to 210° K. and continued at ambient temperature in an ether solvent, the mole ratio of intermediate to living polymer being preferably about 0.4:1 to 1.2:1, especially 0.5:1 to 1.0:1.

Other living polymers useful in this invention are: polyisoprene$^\ominus$ and polybutadiene$^\ominus$ These very high molecular weight copolymers can also be used in the field of coating material, elastomers and hot-melt adhesives.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLES 1 TO 5

Preparation of the aromatic hydrocarbon resin containing vinylketone groups 500 ml (Examples 1 and 3 to 5) or 750 ml (Example 2) of methylene chloride and 50 g of an unsaturated hydrocarbon resin starting material containing units derived from the following hydrocarbons, in mole %: styrene: 10%, vinyltoluenes: 35%, indene: 34%, α-methylstyrene: 3%, methylindene: 18%, having a number-average molecular weight of 1,700, a KraemerSarnow softening point (French Standard Specification 67001) of 140° C. and an iodine number (ASTM Standard Specification D 1959-69) of 39, are introduced into a reactor equipped with regulated heating and cooling means and with stirring means. The unsaturated hydrocarbon resin starting material has been obtained by cationic polymerization, in the presence of $BF_3$, of a batch like batch B disclosed in U.S. Pat. No. 4,100,336. The non-polymerizable hydrocarbons have been further distilled off from the resin solution.

The amounts of acrylic acid chloride (Examples 1 to 3) or methacrylic acid chloride (Examples 4 and 5) mentioned in Table I are introduced gradually into the resulting solution, at ambient temperature. The amounts of pulverulent anhydrous aluminum chloride indicated in Table I are then introduced very gradually into the reaction mixture, at ambient temperature and with vigorous stirring. After a reaction time of 30 minutes, the reaction mixture, which is dark red in color, is poured into a mixture of ice and hydrochloric acid, with vigorous stirring. Decolorization is complete. The methylene chloride is distilled at ambient temperature under reduced pressure. The resin containing vinylketone groups is precipitated. It is filtered off, ground, washed a second time with acidified water, filtered off again and dried. The resin obtained is purified by dissolving it in benzene or toluene, filtering the solution and distilling the solvent under reduced pressure. The resultant purified resin is then analyzed to determine the number-average molecular weight and the average number of vinylketone groups attached per aromatic nucleus, the latter determination being conducted by polarography. The values found are shown in Table I.

EXAMPLE 6

Anionic homopolymerization of the aromatic hydrocarbon resin containing vinylketone groups 19.2 mg of butyl-lithium are introduced into a cooled reactor containing 50 ml of anhydrous tetrahydrofuran. An anhydrous solution of 5 g of the resin obtained in Example 1 in 50 ml of tetrahydrofuran is added to the resulting solution, at a temperature of −70° C. The cooling bath is removed and the reaction medium gradually returns to ambient temperature, at which it is maintained for 20 hours. The reaction medium is precipitated in methanol and the precipitate obtained is filtered off and dried. The resultant polymer has a weight-average molecular weight ranging from $10^5$ to $2 \times 10^7$ (two maxima, at $1.7 \times 10^5$ and $1.3 \times 10^7$, are observed in the molecular weight distribution function) and does not possess gelled particles.

EXAMPLE 7

Anionic copolymerization of the aromatic hydrocarbon resin containing vinylketone groups with a living polymethyl methacrylate A living polymethyl methacrylate is prepared beforehand in the following manner. 8.3 g of anhydrous methyl methacrylate are introduced, at −70° C., into a reactor containing a solution of 146.4 mg of diphenylhexyl-lithium in 50 ml of anhydrous tetrahydrofuran. The reaction lasts two hours.

A solution of 5 g of the unsaturated hydrocarbon resin obtained in Example 1 is then introduced into the reaction medium, at −70° C. The cooling bath is removed and the reaction medium gradually returns to ambient temperature, at which it is kept for 2 hours. The reaction medium is then precipitated in methanol and the precipitate obtained is filtered off and dried. The copolymer has a weight-average molecular weight ranging from $10^4$ to $1.7 \times 10^7$, with a maximum at $1.7 \times 10^5$, and does not possess gelled particles.

TABLE I

| | | | Resin obtained | |
|---|---|---|---|---|
| Example | Acid chloride g | $AlCl_3$ g | Mn | Number of vinylketone groups per aromatic nucleus |
| 1 | 6.66 | 12 | 4,980 | 0.058 |
| 2 | 6.66 | 12 | 4,800 | 0.035 |
| 3 | 4.8 | 7.9 | 4,100 | 0.025 |
| 4 | 6.42 | 10 | 2,900 | 0.063 |
| 5 | 5 | 7.95 | 3,150 | 0.042 |

The number-average molecular weight of the acylated resin is either two or three times greater than that of the original resin. This increase in molecular mass is without doubt due to polymerization of certain of the vinylketone groups containing molecules during the acylation reaction.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An acylated aromatic hydrocarbon resin, substantially devoid of gel formation, having a number average molecular weight of about 2,000 to 6,000, and consisting essentially of an aromatic hydrocarbon polymerizate acylated with vinyl ketone groups of the formula:

RR'C=CR''—CO— wherein R, R' and R'' each independently represent hydrogen, methyl, ethyl, n-propyl, isopropyl or halogen, the proportion of said vinyl ketone groups being about 0.02 to 0.07 vinyl ketone group per aromatic nucleus; wherein said aromatic hydrocarbon polymerizate has a number average molecular weight of about 500 to 2,500, and is formed from a mixture of hydrocarbons comprising 1–30 mol % styrenes, 9–60 mol % vinyltoluenes, and 10–90 mol % indenes.

2. A polymer of an acylated aromatic hydrocarbon resin, having a weight-average molecular weight of from $10^4$ to $2 \times 10^7$ and substantially devoid of gelled particles, said polymer being prepared by polymerization of an acylated aromatic hydrocarbon resin intermediate, in the presence of an anionic catalyst; wherein said intermediate is an acylated aromatic hydrocarbon resin, substantially devoid of gel formation, having a number average molecular weight of about 2,000 to 6,000, and consisting essentially of an aromatic hydrocarbon polymerizate acylated with vinyl ketone groups of the formula:

RR'C=CR''—CO— wherein R, R' and R'' each independently represent hydrogen, methyl, ethyl, n-propyl, isopropyl or halogen, the proportion of said vinyl ketone groups being about 0.02 to 0.07 vinyl ketone group per aromatic nucleus; wherein said aromatic hydrocarbon polymerizate has a number average molecular weight of about 500 to 2,500, and is formed from a mixture of hydrocarbons comprising 1–30 mol % styrenes, 9–60 mol % vinyltoluenes and 10–90 mol % indenes.

3. A process for producinhg a high polymer of an acylated aromatic hydrocarbon resin, comprising the steps of:
   (a) subjecting naphtha to a steam cracking step and recovering a mixture of aromatic hydrocarbons comprising 1–30 mol % styrenes, 9–60 mol % vinyltoluenes, and 10–90 mol % indenes;
   (b) polymerizing said mixture of aromatic hydrocarbons, and recovering an aromatic hydrocarbon polymerizate, having a number-average molecular weight between 500 and 2,500, and a softening point of 50°–150° C.;
   (c) acylating said polymerizate with a sufficient proportion of acylating reagent to form an acylated aromatic hydrocarbon resin, substantially devoid of gel formation, having a number-average molecular weight of about 2,000 to 6,000, and consisting essentially of an aromatic hydrocarbon polymerizate acylated with vinyl ketone groups of the formula:

RR'C=CR''—CO— wherein R, R' and R'' each independently represent hydrogen, methyl, ethyl, n-propyl, isopropyl or halogen, the proportion of said vinyl ketone groups being about 0.02 to 0.07 vinyl ketone group per aromatic nucleus, and recovering resultant acylated resin; and
   (d) polymerizing said acylated resin, in the presence of an anionic catalyst, and recovering resultant polymer, having a weight average molecular weight of from $10^4$ to $2 \times 10^7$ and being substantially devoid of gelled particles.

4. A process for producing a high polymer of an acylated aromatic hydrocarbon resin, comprising the step of polymerizing an acylated aromatic hydrocarbon resin, in the presence of an anionic catalyst, and recovering resultant polymer, having a weight average molecular weight of from $10^4$ to $2 \times 10^7$ and being substantially devoid of gelled particles; wherein said acylated resin is an acylated aromatic hydrocarbon resin, substantially devoid of gel formation having a number average molecular weight of about 2,000 to 6,000, and consisting essentially of an aromatic hydrocarbon polymerizate acylated with vinyl ketone groups of the formula:

RR'C=CR''—CO— wherein R, R' and R'' each independently represent hydrogen, methyl, ethyl, n-propyl, isopropyl or halogen, the proportion of said vinyl ketone groups being about 0.02 to 0.07 vinyl ketone group per aromatic nucleus; wherein said aromatic hydrocarbon polymerizate has a number average molecular weight of about 500 to 2,500, and is formed from a mixture of hydrocarbons comprising 1–30 mol % styrenes, 9–60 mol % vinyltoluenes, and 10–90 mol % indenes.

5. An acylated resin according to claim 1, wherein said polymerizate contains 30–60 mol % indenes derived from indene and its higher homologs.

6. An acylated aromatic resin according to claim 1, wherein said vinyl ketone groups are acrylyl or methacrylyl.

7. A polymer according to claim 2, wherein said polymerizate contains 30–60 mol % units derived from indene and its higher homologs.

8. A polymer according to claim 2, wherein said vinyl ketone groups are acrylyl or methacrylyl.

9. An acylated aromatic resin according to claim 1 wherein said mixture of hydrocarbons comprises 10 to 25 mol % styrenes.

10. An acylated aromatic resin according to claim 1 wherein said mixture of hydrocarbons comprises 30 to 45 mol % vinyltoluenes.

11. An acylated aromatic resin according to claim 1 wherein said mixture of hydrocarbons comprises 30 to 60 mol % of indene plus methylindenes.

12. A polymer according to claim 2 wherein said mixture of hydrocarbons comprises 10 to 25 mol % styrenes.

13. A polymer according to claim 2 wherein said mixture of hydrocarbons comprises 30 to 45 mol % vinyltoluenes.

14. A polymer according to claim 2, wherein said mixture of hydrocarbons comprises 30 to 60 mol % of indene plus methylindenes.

15. A polymer according to claim 12, wherein said mixture of hydrocarbons comprises 30 to 45 mol % vinyltoluenes, and 30 to 60 mol % of indene plus methylindenes.

16. A process according to claim 4, wherein said acylated aromatic resin is prepared by acylating said polymerizate with a sufficient proportion of a substituted or unsubstituted acrylyl acylating agent to graft onto the aromatic nuclei thereof said acylating agent to graft onto the aromatic nulcei thereof said proportion of vinyl ketone groups.

17. A process according to claim 16, wherein said acylating agent is an acyl chloride, and the acylation is effected in the presence of anhydrous aluminum chloride.

18. A process according to claim 17 wherein said acyl chloride is acrylyl or methacrylyl chloride.

19. A process according to claim 4 wherein said anionic polymerization is started at a temperature of 200°–210° K. and then permitted to warm and continue at ambient temperature; whereby crosslinking is impeded and the resultant product is soluble.

20. An acylated aromatic resin according to claim 9, wherein said mixture of hydrocarbons comprises 30 to 45 mol % vinyltoluenes, and 30 to 60 mol % of indene plus methylindenes.

* * * * *